Patented Aug. 1, 1944

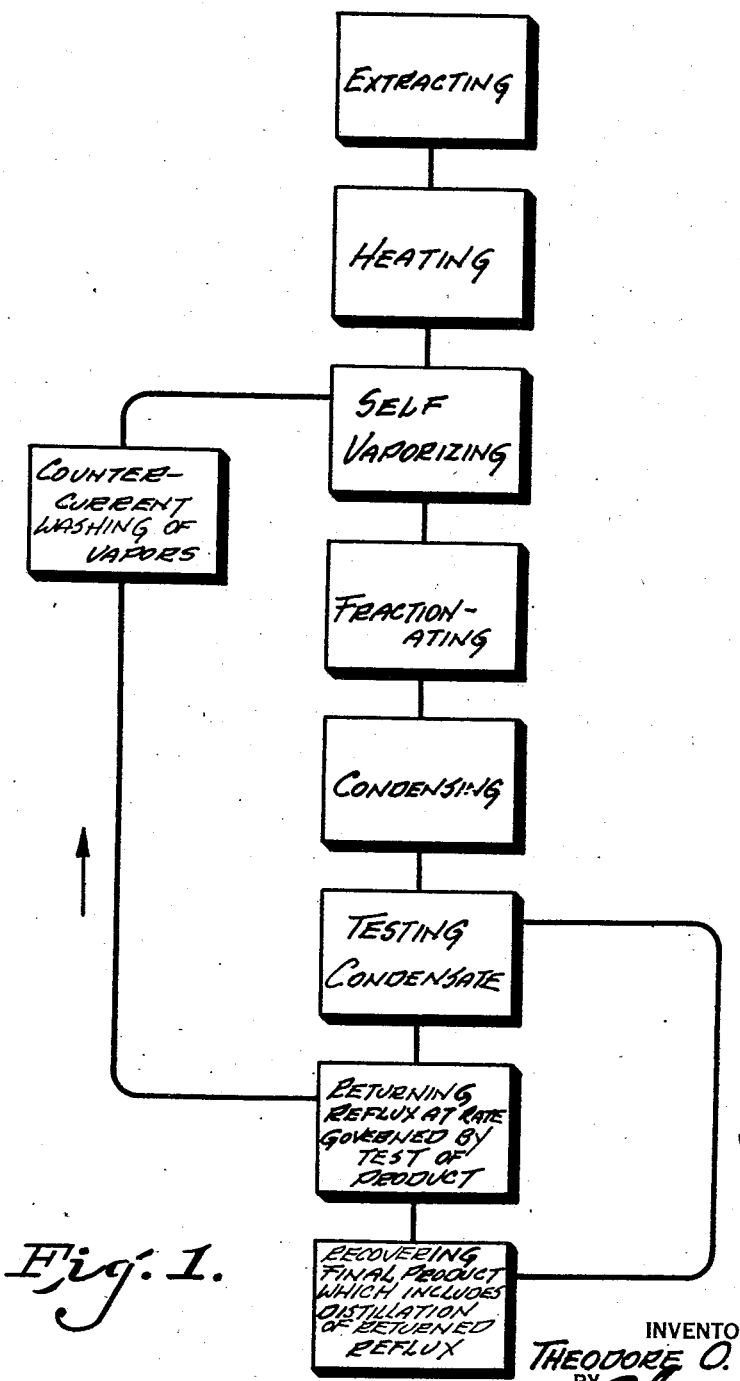

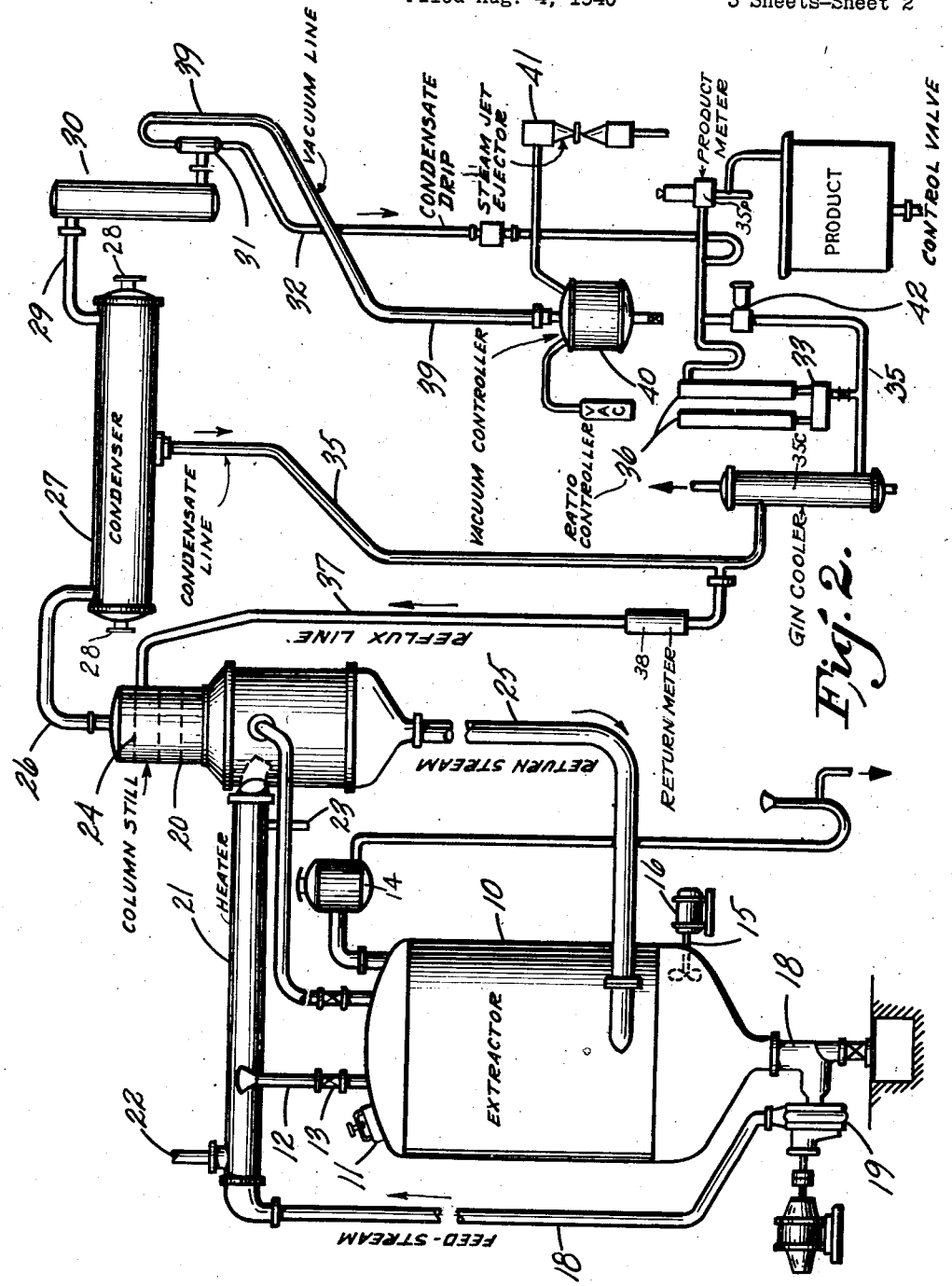

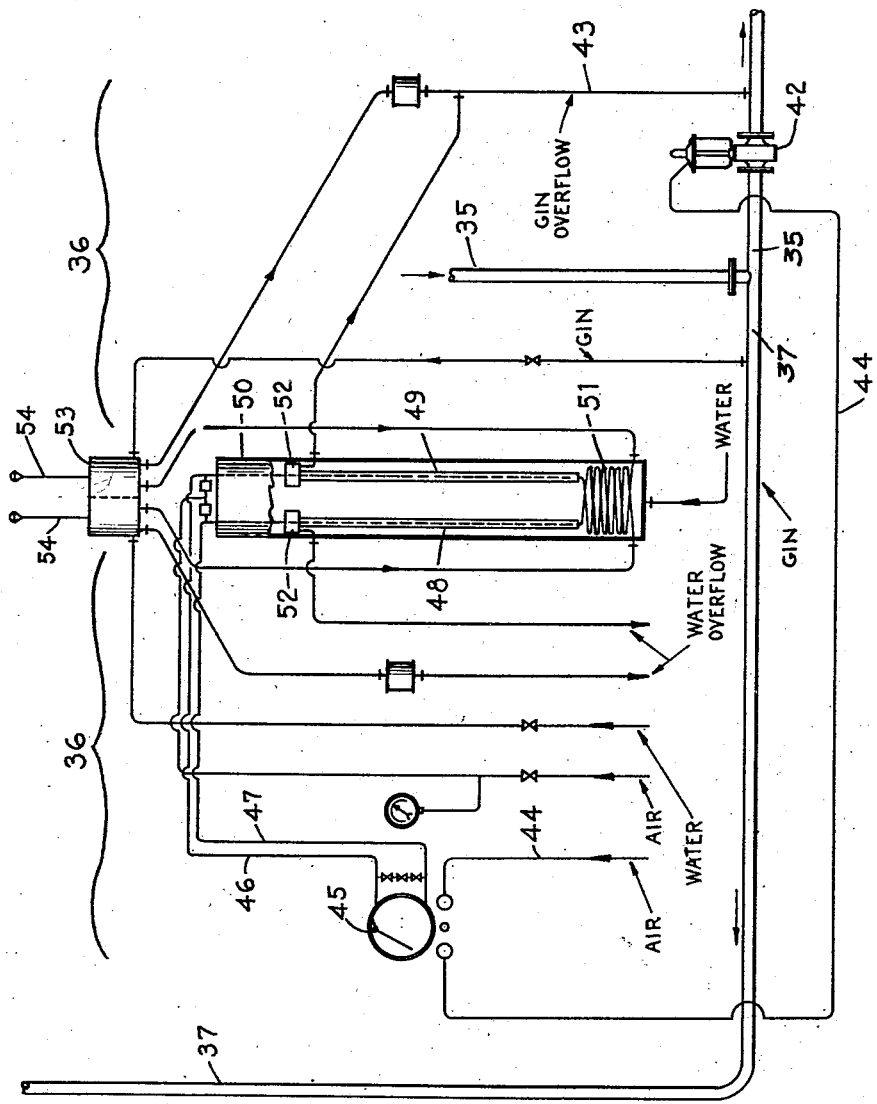

2,354,897

UNITED STATES PATENT OFFICE 2,354,897

APPARATUS FOR CONSTANT CONCENTRATION DISTILLATION

Theodore O. Wentworth, Cincinnati, Ohio, assignor to The Vulcan Copper & Supply Company, Cincinnati, Ohio, a corporation of Ohio Application August 4, 1940, Serial No. 351,352

5 Claims. (Cl. 202—161)

This invention relates to a distillation apparatus. It lies among the objects of the invention to provide an apparatus for furnishing a product of distillation, the concentration of which as regards the lighter constituent will remain substantially constant throughout the ordinary range of disilation times and temperatures.

The apparatus herein set forth has the advantage, however, of being nearly completely automatic in its operation.

In the drawings,

Figure 1 is a flow sheet which illustrates the steps which are carried out in the apparatus.

Figure 2 is a side elevation, somewhat diagrammatic, which shows my still and its accessories.

Figure 3 is a diagrammatic view of the regulating apparatus provided to test the product and to automatically return reflux condensate to the still at a rate sufficient to maintain the desired concentration of the distillate.

The apparatus as shown is intended for use in connection with the low temperature process of extracting gin flavoring materials and distilling gin. In general, the production of gin involves first the extraction with neutral spirits or alcohol of higher or lower proof of a mixture of botanicals comprising certain herbs, seeds and related material and second the distillation from the extracting liquid, of the alcohol, thereby carrying along certain volatile and essential oils which impart the flavor to the finished product. I have found that a gin of superior flavor such as is produced by a low temperature and vacuum distillation may be suitably manufactured by the method and in the apparatus described herein. It is to be understood that I lay no claim to having invented either low temperature distillation or vacuum distillation of this product.

Referring now to Figure 2, 10 is a charging tank or extractor which contains the various herbs, seeds, etc., which are to be extracted. It is into this vessel that the dilute alcoholic solution is placed so that it may extract the essential oils from the herbs, etc., before it is to be distilled. A charging opening 11, a ventpipe 12 in which there is a valve 13 and a vacuum break 14 are also provided. The contents may be stirred by means of an agitator 15 which is driven by an electric motor 16. The bottom 17 is preferably made conical and connected to the feed-stream line 18 containing pump 19, the function of which is to deliver liquid including some suspended solid matter, to a column still 20 through a heater or calandria 21, where the required heat is supplied. The calandria is a conventional unit comprising a shell with internal nests of tubes. Steam may be introduced through a pipe 22. An exit pipe 23 for condensed steam is also provided.

Heater 21 is arranged to deliver hot dilute alcoholic solution into the lower part of column 20 which lower part is a free space large enough to contain a substantial quantity of liquid. The preferred dimensions for the still in a unit capable of producing 6,000 proof gallons of gin distillate over a 20 hour distilling cycle are as follows, when it is desired to maintain the distillate at about 160 proof: 60" in diameter x 156" high.

These dimension are given by way of an example only and are not controlling. The column may be provided with as many as ten trays but six are sufficient for most uses and in this case are preferred in order to keep the overall pressure drop at a minimum. The fractionating column may be of any suitable type having the necessary fractionating efficiency. A return-stream pipe 25 connects the lower part of still 20 to the lower part of the extractor or charging vessel 10. A vapor pipe 26 of large diameter connects the upper end of still 20 with the condenser 27. The latter is provided with cooling water pipes 28.

A second vapor pipe 29 connects the condenser 27 with a vent cooler 30 which is also provided with cooling surface. A trace of gin may be carried over to and condensed in cooler 30. This condensate is directed through condensate drip line 32 to the product receiver.

Connected to the lower part of condenser 27, below pipe 29 there is a condensate delivery pipe 35 which is adapted to deliver the condensate by gravity to a density-governed ratio controller 36 and which contains a gin cooler 35c having a bottom inlet and top outlet for the cooling medium. The density-governed ratio controller 36 actuates an automatic control valve 42 which controls the rate of flow of product gin, the amount of gin flowing into the "product" storage vessel being indicated by product meter 35p. The remainder of the condensate is returned by gravity to the column through reflux pipe 37, which contains a reflux meter 38 for indicating the amount of reflux flowing to still 20. The arrangement shown in Figure 2 is satisfactory for vacuum operation; for operation at atmospheric pressure, it would be necessary to raise the condenser or provide a pump to return the reflux.

Since it is desirable that the interior of still 20 be kept under a constant negative pressure, a vacuum line or pipe 39 extends from the top of receiver 31 through a vacuum controller 40 to a steam jet vacuum ejector or exhauster 41. It is obvious therefore that the degree of vacuum in the apparatus can be controlled by the action of the vacuum controller, although the representation of such connection as conventionalized is per se well known.

The combination of density-governed controller 36 and valve 42 is that element in the combination which determines the proportion of the total condensate which is to be returned to the still as reflux. The ratio controller 36 is of the Foxboro differential pressure "Stabilog" type. The controller is arranged to position a Foxboro "Stabilflo" valve or its equivalent. The controller mechanism of element 36 is described in U. S. Reisue Patent 20,092. The valve 42 is of the kind described in Patent 1,881,798.

In the apparatus shown, the head of liquid in the pipe 35 is sufficient to return reflux to the bubble tower 20 through pipe 37. However, in case an arrangement of the still is desired in which there is not enough head to return the reflux, the latter may be pumped.

Figure 3 shows in detail the control apparatus which has been referred to generally as 36. It also shows the nature of the connection between the ratio controller 36 and the valve 42. In Figure 3 there is shown the position of valve 42 in condensate line 35 between a gin overflow 43 on one side and the reflux line 37 on the other. Valve 42 as may be learned by referring to the patents mentioned is of the diaphragm actuated type and is therefore connected by means of an air pressure transmitting pipe 44 to a differential pressure controller 45 of the Foxboro "Stabilog" type. This controller is preferably of the bell type to provide the required sensitivity. Controller 45 is in turn set by a differential pressure of air or similar fluid transmitted through pipes 46 and 47. It is the function of controller 45 to regulate a stream of comparatively high pressure air flowing through air supply pipe 44 which is connected through the controller 45. The net result of such arrangement is that a very slight differential pressure in pipes 46 and 47 is able to control the valve 42, the operation of which requires a considerable force.

The setting of controller 45 is governed by the difference in density of two liquids contained in columns 48 and 49. These columns which are not necessarily of equal lengths, are contained within a constant temperature bath 50, the constant temperature liquid of which may be water. Column 48 contains water as the liquid of reference having a known and standard density. Column 49 contains gin, the density of which is to be continuously gauged. It is to be understood that gin is continuously flowing through column 49 so that the flowing liquid will be an index of the density of the gin being continuously delivered by the still. Below the columns there are provided a plurality of coils of metal tubing 51 which lie within the bath 50 and are intended for the delivery of water and gin separately to the respective columns 48 and 49. The purpose of the coils 51 is to enable the liquids to be adjusted to the temperature of the bath before entering the columns. At the top of each column there is a weir 52 which acts to adjust the length of its respective column. Into each column 48 and 49 there extends a central tube preferably metallic, through which a constant stream of air is caused to bubble. The rate of air flow is governed by a constriction in each of the said tubes at a point above each column. These constrictions 55 are preferably made adjustable in order to insure an equal rate of air flow for each tube. Delivery of gin and water to the coils 51 and so to columns 48 and 49 at a constant rate is insured by the provision of a reservoir 53 arranged to constantly overflow gin and water from separate compartments. The reservoir is covered but is provided with covered vents 54.

The operation of the controller is as follows: Water and gin pass through the respective tubes 48 and 49 at a substantially constant rate and at a uniform temperature. During this passage air of substantially constant volume and pressure is bubbled through each column. The variation in the density of the liquid of the columns in respect to each other will cause a variation in the pressure in the air reservoir of controller 45, thus affecting the pressure in pipe 44 and the setting of valve 42. Consequently the ratio of reflux to the total condensate will be determined by this valve as a function of the continuously measured density of the gin flowing through column 49.

In other words, the density-governed controller 36 is a ratio controller which operates continuously to evaluate the proof of the condensate by evaluating, in terms of air pressure, the ratio between one fixed property (density) of a standard control medium (water) and one variable property (density) of the gin condensate. Since this variable property varies in accordance with the proof of the condensate, the ratio between the fixed and variable properties necessarily varies in accordance with the proof of the condensate so that a predetermined ratio represents a predetermined proof. The individual pressure evaluations are imposed on element 45 of the controller, which element may be set to any of a range of control points, each control point representing a different predetermined air pressure ratio corresponding to a predetermined proof value of the gin condensate. Thus, when element 45 is set to a control point representing the predetermined ratio corresponding to a proof of 165, the pressure values imposed on the element will hold it on that control point so long as the ratio remains unchanged and therefore so long as the proof remains at 165. However, when the condensate proof decreases, the predetermined air pressure ratio will correspondingly change in one direction, causing element 45 to move one way from the predetermined control point. In so moving, it causes valve 42 to be closed to increase the reflux (and decrease the product) sufficiently to restore the proof to its predetermined value.

I claim as my invention:

1. Apparatus for distilling gin under substantially constant vacuum and low temperature conditions comprising: an extractor for holding the usual charge of undistilled botanically-flavored neutral spirits; a distilling column having a flash chamber; means for maintaining the column under substantially constant vacuum of predetermined order; means for continuously cycling the charge liquid by maintaining a feed-stream flow from the extractor to the flash chamber and a return-stream flow from the flash chamber to the extractor; and means, interposed between the extractor and column, for heating the feed stream rapidly to a temperature above its boiling temperature in the flash chamber to effect flash vaporization in said chamber.

2. Apparatus for distilling gin of substantially constant proof under substantially constant vacuum and low temperature conditions comprising: an extractor for holding the usual charge of undistilled botanically-flavored neutral spirits;

a fractionating column having a lower flash chamber and an upper distillation chamber containing a series of distillation plates; means for maintaining the column under vacuum of predetermined order; means for continuously cycling the charge liquid by maintaining a feed-stream flow from the extractor to the upper portion of the flash chamber and a return-stream flow from the bottom of the flash chamber to the extractor; means, interposed between the extractor and column, for heating the feed stream rapidly to a temperature above its boiling temperature in the flash chamber whereby said stream is subjected to flash vaporization in said chamber and the flashed vapors to fractional distillation in the distillation chamber; means for continuously condensing the vapor distillate of the column to produce a continuous stream of gin condensate; and a gin condensate line terminating in reflux and product lines leading respectively to said distillation chamber and a product receiver; and valve control means for controlling the division of condensate into reflux and product, said means operating continuously to evaluate the proof of the condensate and being responsive to variations in the proof from a predetermined value to effect proof-restoring compensatory changes in the division of condensate.

3. The apparatus of claim 2 wherein said valve control means comprise: a valve operable to change the division of condensate; and control means operating continuously to evaluate the proof of the condensate, said means being responsive to variations in the proof from a predetermined value to operate the valve sufficiently to effect proof-restoring compensatory changes in the division of condensate.

4. The apparatus of claim 2 wherein said valve control means comprises: a valve operable to change the division of condensate; and control means operating continuously to evaluate the ratio between one fixed property of a standard control medium and a variable property of the condensate which ratio varies in accordance with variations in the proof of the condensate, said means being responsive to variations from a predetermined ratio, which corresponds to a predetermined proof, to operate the valve sufficiently to effect compensatory changes in the division of condensate which restore said predetermined ratio.

5. The apparatus of claim 2 wherein said valve control means comprises: a valve operable to change the division of condensate; and control means operating continuously to evaluate the ratio between the densities of a standard control medium and of the condensate, said means being responsive to variations from a predetermined ratio, which corresponds to a predetermined proof, to operate the valve sufficiently to effect compensatory changes in the division of condensate which restore said predetermined ratio.

THEODORE O. WENTWORTH.